United States Patent
Blackman et al.

(10) Patent No.: US 10,776,434 B1
(45) Date of Patent: Sep. 15, 2020

(54) SYSTEM AND METHOD FOR DOCUMENT DATA EXTRACTION, DATA INDEXING, DATA SEARCHING AND DATA FILTERING

(71) Applicant: First American Financial Corporation, Santa Ana, CA (US)

(72) Inventors: David Harry Blackman, Corona, CA (US); Dinesh Vayalapadu, Santa Ana, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 583 days.

(21) Appl. No.: 15/353,639

(22) Filed: Nov. 16, 2016

(51) Int. Cl.
| | | |
|---|---|---|
| G06F 15/16 | (2006.01) | |
| G06F 16/9535 | (2019.01) | |
| G06F 16/93 | (2019.01) | |
| G06F 16/31 | (2019.01) | |
| G06F 16/33 | (2019.01) | |

(52) U.S. Cl.
CPC ........ *G06F 16/9535* (2019.01); *G06F 16/316* (2019.01); *G06F 16/3344* (2019.01); *G06F 16/93* (2019.01)

(58) Field of Classification Search
CPC ........ G06F 17/30867; G06F 17/30684; G06F 17/30619; G06F 17/30011; G06K 9/00469; G06K 9/00456
USPC ...................................................... 707/694
See application file for complete search history.

(56) References Cited

U.S. PATENT DOCUMENTS

| 7,751,624 | B2 | 7/2010 | Cantral | |
| 2006/0039610 | A1* | 2/2006 | Cantral | G06K 9/2054 382/190 |
| 2007/0214120 | A1* | 9/2007 | Niendorff | G06Q 10/10 |
| 2008/0091458 | A1* | 4/2008 | Blackman | G06Q 10/087 705/313 |
| 2010/0135579 | A1* | 6/2010 | Newcomer | G06K 9/00469 382/190 |
| 2012/0173521 | A1* | 7/2012 | Lam | G06F 17/30867 707/734 |
| 2012/0323562 | A1* | 12/2012 | Bayer | G06F 16/5846 704/9 |
| 2015/0286630 | A1* | 10/2015 | Bateman | G06F 17/30241 704/9 |
| 2015/0379343 | A1* | 12/2015 | Powell | G06K 9/00469 382/229 |
| 2018/0039907 | A1* | 2/2018 | Kraley | G06K 9/6271 |

* cited by examiner

*Primary Examiner* — Alex Gofman
(74) *Attorney, Agent, or Firm* — Sheppard, Mullin, Richter & Hampton LLP

(57) ABSTRACT

Systems and methods are described for extracting data from digital documents, indexing the data, and providing a user interface for filtering the data and generating a document based on the filtered data. In one implementation, a method includes extracting data from one or more digital documents, the extracted data including elements of a first type, the elements of the first type including key-value pairs; indexing the extracted data; hosting a web-based application instance, the web-based application instance including a user interface for searching the indexed data and filtering elements of the first type based on rules defined by a user of the user interface; receiving rules for filtering the elements of the first type; and filtering the elements of the first type based on the received rules.

18 Claims, 14 Drawing Sheets

Document Details

| Status CD | Document ID | Document Name | Document Type | Created Date | Phrase Codes |
|---|---|---|---|---|---|
| 100 | 9999999 | ALTA Ext Loan Policy 10/61/06 (1) (2006)-N | Lender Policy | 3/25/2015 | LP1, LP2, LP3, . . . . |
| 100 | 9999998 | ALTA Homeowners (Eagle) Policy (2-3-10)-N | Owner Policy | 3/26/2015 | OP1, OP2, OP3, . . . . |
| 100 | 9999997 | Preliminary Report - CA | Title Reports | 3/25/2015 | TR1, TR2, TR3, . . . . |

FIG. 10

FIG. 11

SYSTEM AND METHOD FOR DOCUMENT DATA EXTRACTION, DATA INDEXING, DATA SEARCHING AND DATA FILTERING

TECHNICAL FIELD

The present disclosure relates generally to document processing and document generation. In particular, some embodiments relate to extracting data from digital documents, indexing the data, providing a user interface for retrieving and filtering the data, and generating a document based on the filtered data.

DESCRIPTION OF THE RELATED ART

The title insurance underwriting process has traditionally been a labor intensive process. Large financial institutions that underwrite title insurance employ large numbers of title examiners, abstractors and searchers. These individuals research title histories and laws to determine the possibility of a defect in title to a parcel of land. The research frequently requires searching databases for evidence of title and applying business rules to the evidence to generate title products for customers.

Title insurance protects land purchasers and loan institutions from defects in title. A land purchaser may purchase title insurance to protect from an unknown claim of title. A home purchaser may be required to obtain title insurance prior to obtaining a mortgage on a property. Mortgagees and note purchasers may purchase title insurance to protect their collateral interest in a mortgage. Lien holders may also purchase title insurance to protect their collateral interest in the landowner's debt.

In the underwriting process, the databases searched for evidence of title may be fairly extensive. For example, county databases may be searched for the chain of title for the parcel of land or property. Public record databases may be searched for evidence of mortgages or liens on the parcel of land or property. Court databases may be searched for evidence of judgment liens. Proprietary databases may also be searched for histories of title insurance. Any database containing information for evaluating the risk associated with underwriting title insurance for the parcel of land may be searched.

To make sound title underwriting decisions, a number of financial institutions have developed business rules to be applied as part of the underwriting process. The business rules allow employees at financial institutions to apply objective criteria to selecting and creating title products for a parcel of land or property. An analyst may compare evidence of title with business rules to determine underwriting risk, suitable title insurance products, and to determine if any other information about the land parcel should be acquired prior to making an underwriting decision. The business rules applied during the underwriting process may often vary according to the location of the parcel of land or property and the jurisdiction governing land ownership, taxation, recording and zoning.

The large amount of human effort required to generate a title product often results in significant delays or errors in the underwriting process. The title underwriter may have to search multiple databases for title evidence, compare the evidence with voluminous business rules, create a title report and generate a title insurance product. This may result in significant delays or errors in the acquisition of secured financing or in closing a real property transaction. The lengthy process also affects the sale of mortgages in secondary markets, decreases market liquidity and increases transaction time and cost.

BRIEF SUMMARY OF THE DISCLOSURE

Systems and methods are described for extracting data from digital documents, indexing the data, and providing a user interface for filtering the data and generating a document based on the filtered data.

In one embodiment, a method includes: extracting data from one or more digital documents, the extracted data including elements of a first type, the elements of the first type including key-value pairs; indexing the extracted data; hosting a web-based application instance, the web-based application instance including a user interface for searching the indexed data and filtering elements of the first type based on rules defined by a user of the user interface; receiving rules for filtering the elements of the first type; and filtering the elements of the first type based on the received rules. The extracted elements of the first type may each include a key-value pair and a sentence, a paragraph, or multiple paragraphs.

In some implementations, filtering elements of the first type includes generating a new key-value pair and associated paragraph. In other implementations, filtering elements of the first type includes associating an existing key-value pair with a new paragraph.

In some implementations, filtering the elements of the first type includes initiating a proxy call at the application instance to a rules system storing the received rules.

In one particular implementation, the extracted elements of the first type include title exceptions and key-value pairs, the one more digital documents include real estate documents, and each of the rules specify conditions under which a title exception is included or excluded from a title product. In another particular implementation, the extracted elements of the first type include legal phrases and key-value pairs, and each of the rules specify conditions under which a legal phrase is included or excluded from a contract.

In a further implementation, the method may include: receiving a request to search for a real property at the user interface of the application instance, the request comprising information identifying the real property; and in response to receiving the request, searching the indexed data for information related to the real property. In a particular implementation, searching the indexed data for information related to the real property includes retrieving a historical document associated with the real property (e.g., a current or expired contract or title policy), where the historical document includes one or more phrases. In this implementation, the method may further include filtering one or more of the phrases of the historical document based on the received rules.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

FIG. 6 illustrates a graphical user interface, including a search platform, for an application for generating title products.

FIG. 8 illustrates a graphical user interface, an interface for defining rules for filtering title exceptions, for an application for generating title products.

FIGS. 9-11 illustrate another example graphical user interface that may be implemented as part of an application for generating a title product.

The figures are not intended to be exhaustive or to limit various embodiments to the precise form disclosed. It should be understood that various embodiments can be practiced with modification and alteration.

DETAILED DESCRIPTION

Various embodiments described in the present disclosure are directed toward systems and methods for extracting data from digital documents, indexing the data, and providing a user interface for filtering the data and generating a document based on the filtered data.

Example implementations are directed toward systems and methods for extracting title exception paragraphs from historical property records and indexing the title exception paragraphs in a database system. As described herein, the database system provides an application (e.g., a web-based application) for retrieving the indexed title exceptions and filtering individual title exceptions based on user-defined rules or filters. The filtered individual title exceptions may be used to generate a title product such as a title examination report or title insurance policy. As used herein, the term "title exception" generally refers to one or more paragraphs of text that defines a transaction-specific item that is not covered under a title policy for a parcel of land or property. For example, title exceptions may comprise judgments, easements, covenants taxes, special assessments, mechanic's liens, and covenants, conditions, and restrictions (CC&R's).

It should be noted that although various embodiments are described herein with respect to real estate-related documents, and particularly title reports, one having ordinary skill in the art reading this description would fully appreciate and understand that the various embodiments could be used with documents from other fields and industries not pertaining to real estate or title examination. For example, legal phrases may be extracted from historical contracts and indexed in a database that provides an application for retrieving the indexed legal phrases and filtering the legal phrases based on user-defined rules or filters.

Figure 1:
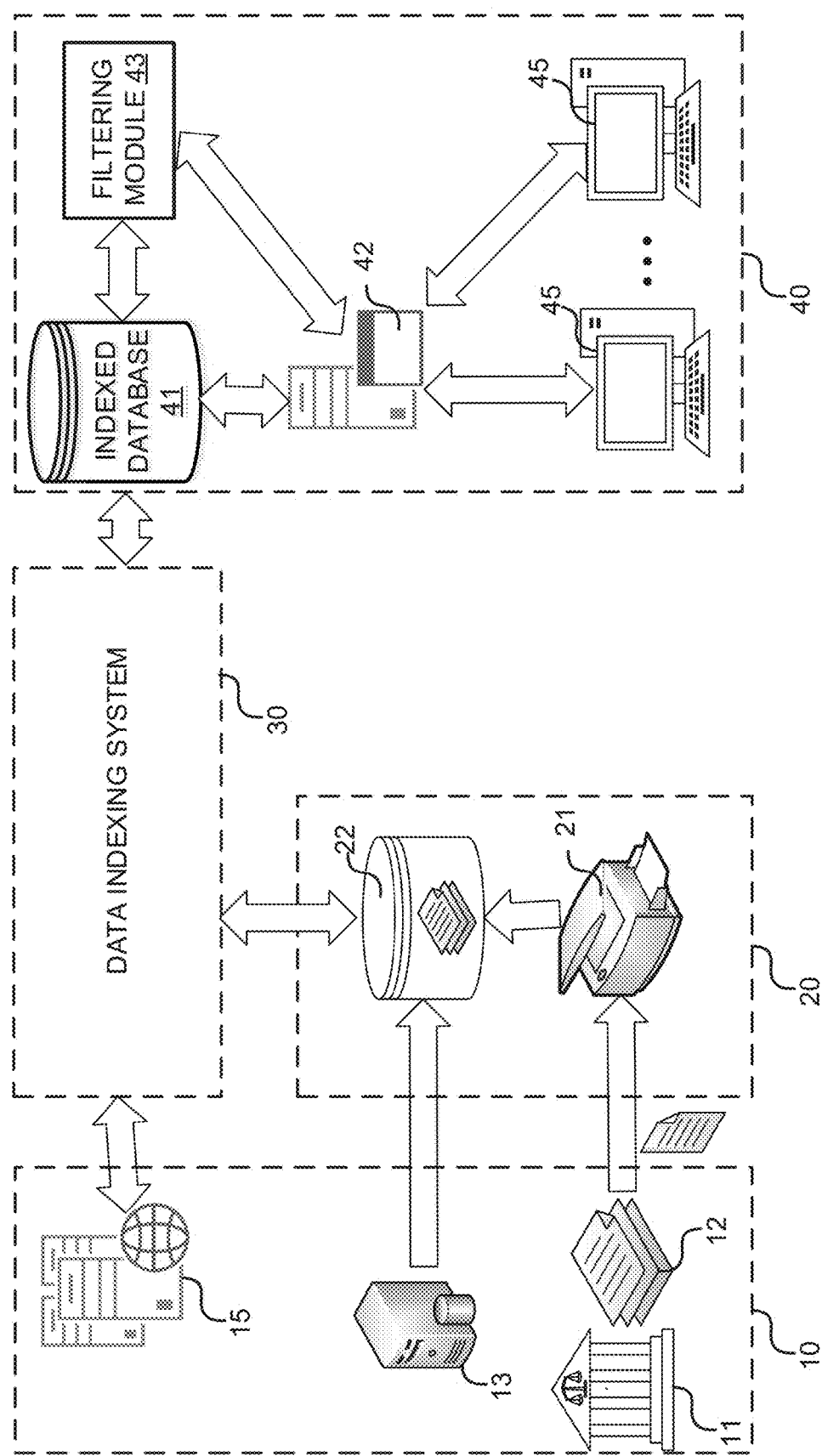
FIG. 1 illustrates an example system in which embodiments disclosed herein may be implemented.

FIG. 1 illustrates an example system in which embodiments disclosed herein may be implemented. The system includes data sources 10, data extraction system 20, data indexing system 30, and database system 40. In implementations, some or all components of systems 10, 20, 30, and 40 may be implemented as a part of a single enterprise system. For example, data retrieval and communication among the various systems may be performed along a common enterprise service bus.

In this exemplary system, data sources 10 in combination with OCR and data extraction system 20 provide digital documents from which data is extracted. Data sources 10 may comprise record offices 11 housing physical documents 12, electronic systems without web services 13 (e.g., legacy systems without web services), and electronic systems with web services 15 (e.g., an application server with a web server).

For example, in the title industry, where the retrieved digital documents are real-estate-related documents, the data sources may include web-based application servers of title companies, legacy application servers of title companies, title plants, or county recorders. In this example implementation, record offices 11 may comprise a country recorder's office, systems 13 may comprise legacy title escrow systems (e.g., systems that store real-estate-related documents in word perfect form) and systems 15 may comprise transactional title or escrow systems that generate title commitments or policies that another system may interact with via a web service.

Data extraction system 20 may comprise a document scanner 21 for digitizing physical documents into image files. Additionally, data extraction system 20 may comprise OCR software for making the document image files (e.g., scanned documents 12 and document image files retrieved from system 13) computer-searchable. In one embodiment, the OCR software may be built into scanner 21. Furthermore, data extraction system 20 may comprise software modules for extracting data from the computer-searchable documents. OCR'ed documents and extracted data may be stored in database 22 in preparation for indexing. Methods for performing OCR and data extraction on received document image files are further described below.

The extracted data may subsequently be tokenized and indexed using data indexing system 30. In some embodiments, web-based services 15 and/or data extraction system 20 may have already tokenized and/or indexed the data. In such embodiments, web-based services 15 may directly provide indexed data to database system 40 (e.g., via proxy calls). Alternatively, data indexing system 30 may provide an integration platform for aggregating the disparate data sources into a common index. Data elements of the indexed data, in various embodiments, may be associated with a phrase code or name that identifies the type of the data element, a group code or name, a document ID from which the data element was extracted, a real property associated with the data element, and other information that may be used to index the data element. For example, title exception paragraphs extracted from real estate documents (e.g., existing or former title policies) may be associated with a code that identifies the paragraph as a title exception and another code or ID that associates the title exception with a particular address. As another example, using title exception paragraphs from documents, key-value pairs such as dates or instrument numbers may be extracted from documents.

Database system 40, in this exemplary embodiment, includes an indexed database 41 for storing the indexed data and an application server 42 for providing one or more applications (e.g., a filtering module 43) to systems 45 for filtering data elements of the indexed data. In some embodiments, described below, data extraction and indexing may be triggered in response to a request initiated by one or more systems 45 executing an application provided by application server 42. In this manner, indexed database 41 may be built upon and populated with indexed data each time a request for data is made.

In a particular embodiment, system 40 indexes individually extracted title insurance exceptions from previously created real estate documents and/or real estate data systems for reuse in the creation of new and more recent title reports. In this embodiment, filtering module 43 may be provided to one or more systems 45 for including, modifying, or removing individual title exceptions based on filters defined with respect to the content of the title exceptions. Additionally, filtering module 43 may transform or modify historical phrases or key-value pairs to update or modify language. The title exceptions may be stored and indexed in database 41, which may prepopulated with indexed title exceptions extracted from property records, or populated in response to a request initiated at systems 45. For example, system 45 may initiate a request order to retrieve title exceptions from a title policy associated with a property or from title policies associated with nearby properties.

Application server 42 may provide filtering module 43 as part of a web-based application. The web-based application may be a browser based web application (e.g., instructions contained in a webpage) or a client based web application (e.g., client program installed on system 45 interacts with application server 42 on the web). Alternatively, in other embodiments the filtering module 43 may be provided as a native-based application (e.g., executable code stored on system 45).

Figure 2:
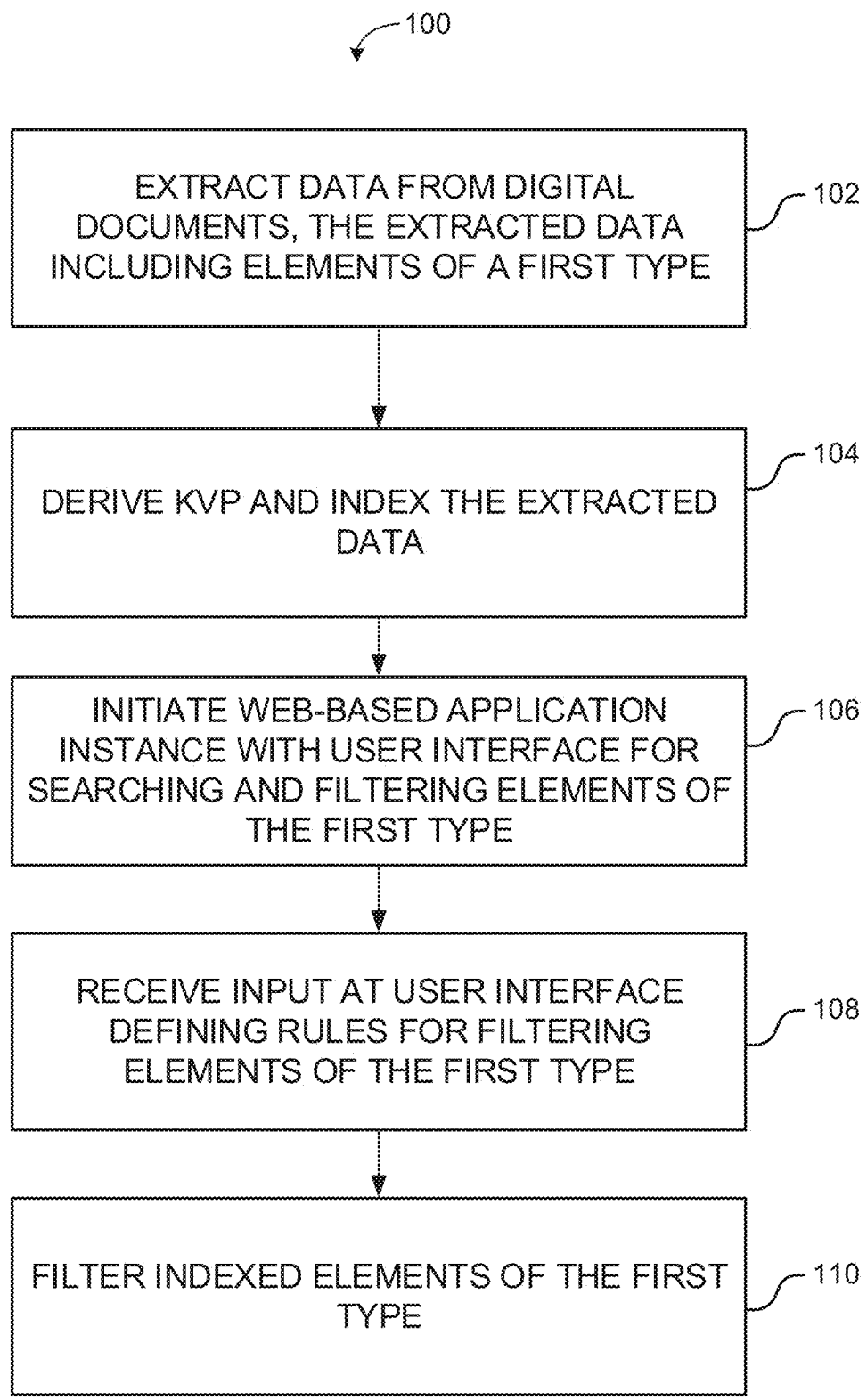
FIG. 2 is an operational flow diagram illustrating an example process that may be performed by the system of FIG. 1 in accordance with embodiments.

FIG. 2 is an operational flow diagram illustrating an example process 100 that may be performed by the system of FIG. 1 in accordance with embodiments. At operation 102, data is extracted from digital documents. The extracted data includes elements of a first type. For example, elements of the first type may include sentences, paragraphs, or multiple paragraphs. In addition, key-value pairs may be derived from the extracted data for later transformative use. At operation 104, the extracted data is indexed. In embodiments, the extracted data may be indexed using a reference to a database table. For example, the extracted data may be indexed using balanced trees, B+ trees, hashes, or other suitable means. At operation 106, a web-based application instance with a user interface for searching, filtering, or transforming the indexed elements of the first type is initiated. For example, system 45 may execute a web-based application instance hosted by application server 42. Thereafter, at operation 108, system 45 may provide input at the user interface defining or selecting rules for filtering indexed elements of the first type. In implementations, the rules may be used to modify indexed elements of the first type, create new indexed elements of the first type, or select indexed elements of the first type. Subsequently, at operation 110 the indexed elements of the first type may be filtered using the user rules. For example, indexed elements of the first type may be selected, excluded, modified, or created.

By way of example, consider the case where data is extracted from title documents to provide information for the creation of title policies. In this example, the extracted elements of the first type may comprise title exceptions extracted from title policies or other real-estate-related documents. During indexing, the extracted title exceptions may be assigned an identifying code and linked to a property address, a document (e.g., a title policy), and other information. Alternatively, previously extracted key-value pairs may be used to create new or updated forms of products. Thereafter, a web-based application may be provided to a system to search and/or filter individual title exceptions. For example, the system may initiate a search for title exceptions related to a particular parcel. As part of the search, all indexed title exceptions relating to that parcel may be displayed (e.g., title exceptions from past title policies or from title policies on adjoining properties). As part of the web-based application (or another web-based application) the system may define rules for filtering out title exceptions, adding new title exceptions, or modifying existing title exceptions. For example, title exceptions that are no longer applicable to a property (e.g., a tax exception for a fiscal year that have been paid) may be filtered from displayed results and replaced with relevant and timely title exceptions.

As another example, consider the case where data is extracted from contracts to provide information for the creation of new contracts. For instance, the extracted elements of the first type may comprise legal phrases extracted from mortgage agreements or other agreements relating to a property. During indexing, the extracted legal phrases may be assigned an identifying code and linked to a property address, a document (e.g., a mortgage agreement), and other information. Thereafter, a web-based application may be provided to a system to search and/or filter individual legal phrases. As part of the web-based application, the system may define rules for filtering out legal phrases, adding legal phrases, or modifying legal phrases. These rules may be used to generate a new mortgage agreement.

Figure 3A:
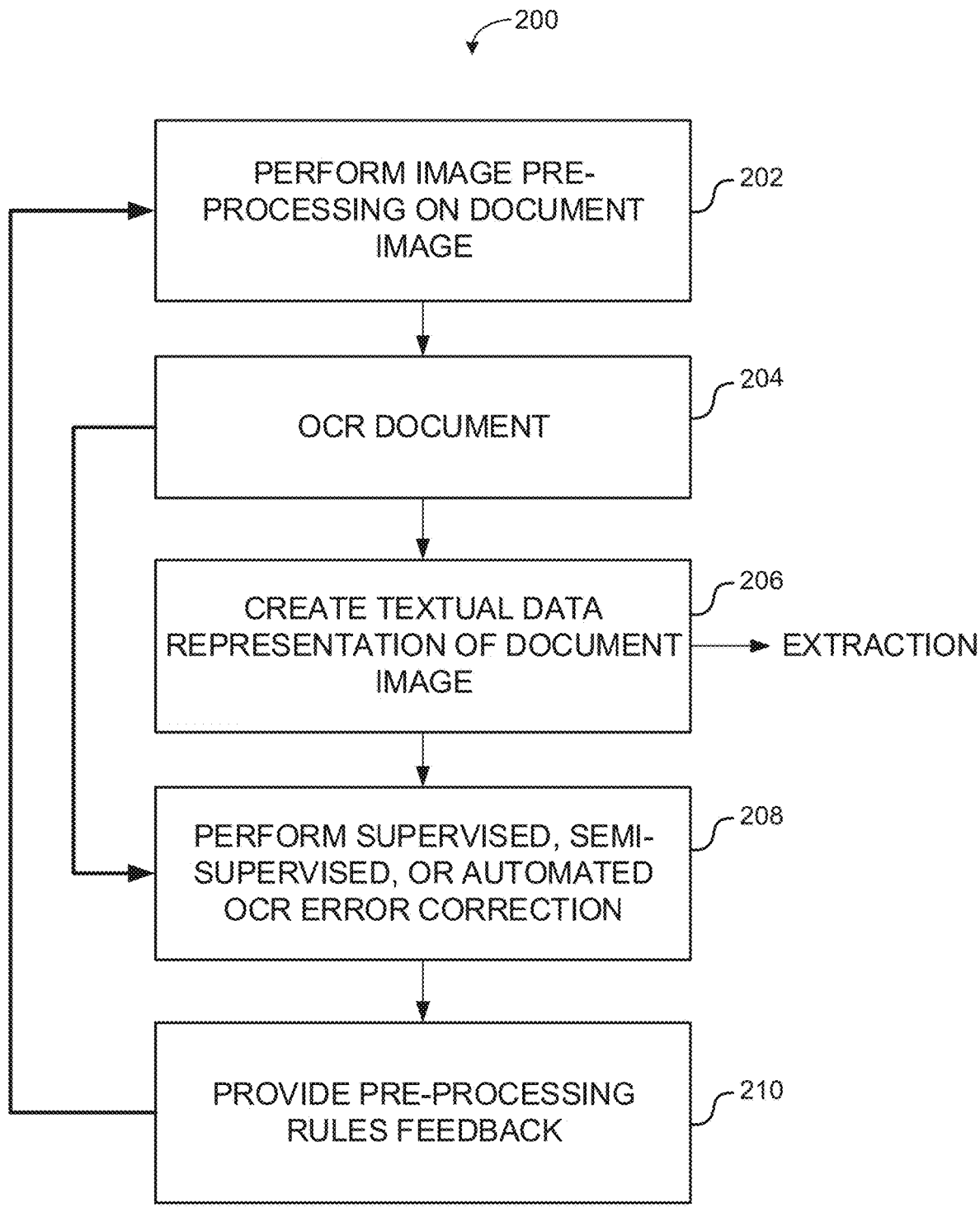
FIG. 3A illustrates an example OCR process that may be performed in accordance with various embodiments.
Figure 3B:
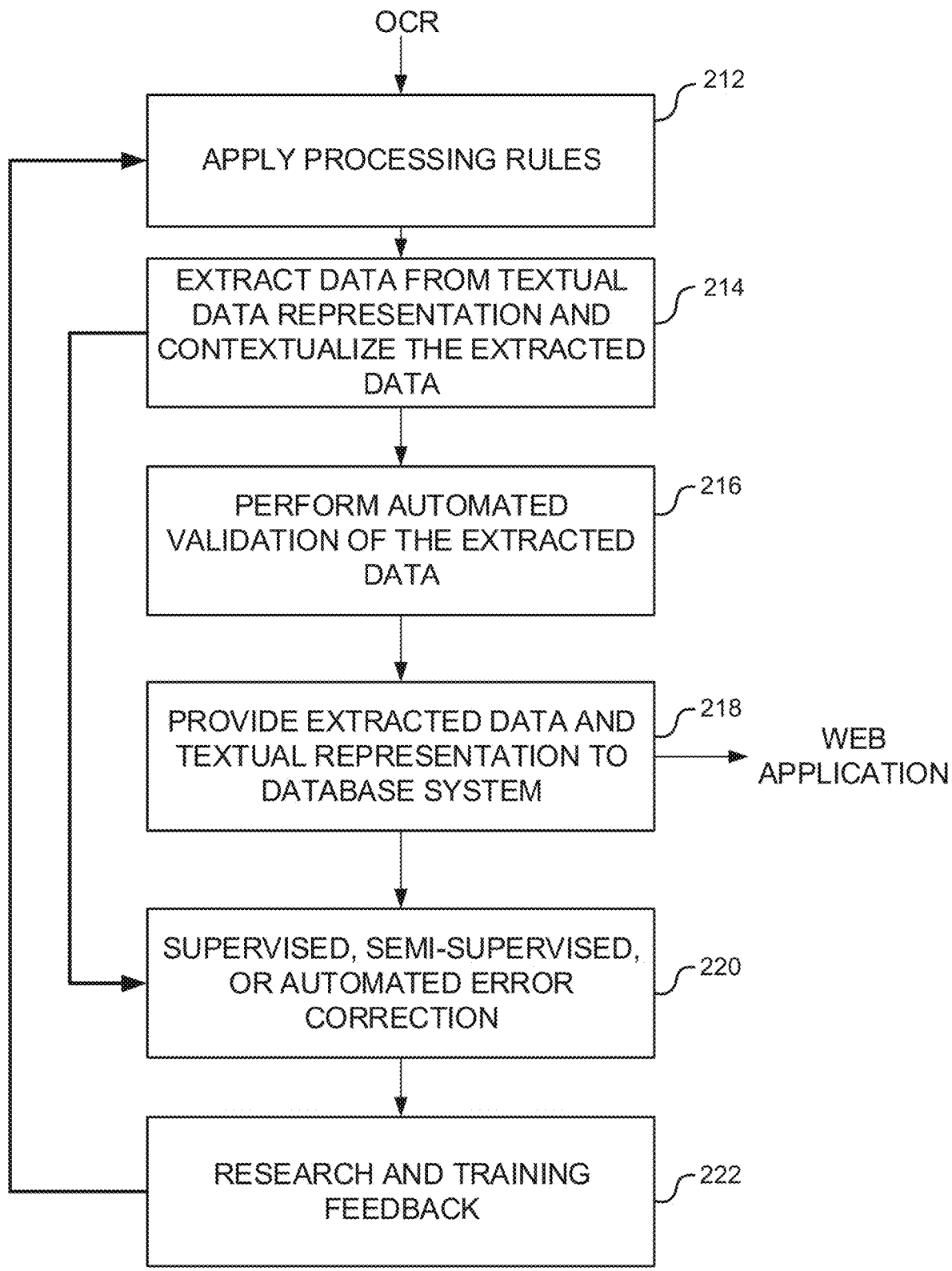
FIG. 3B illustrates an example extraction process performed in accordance with various embodiments.
Figure 3C:
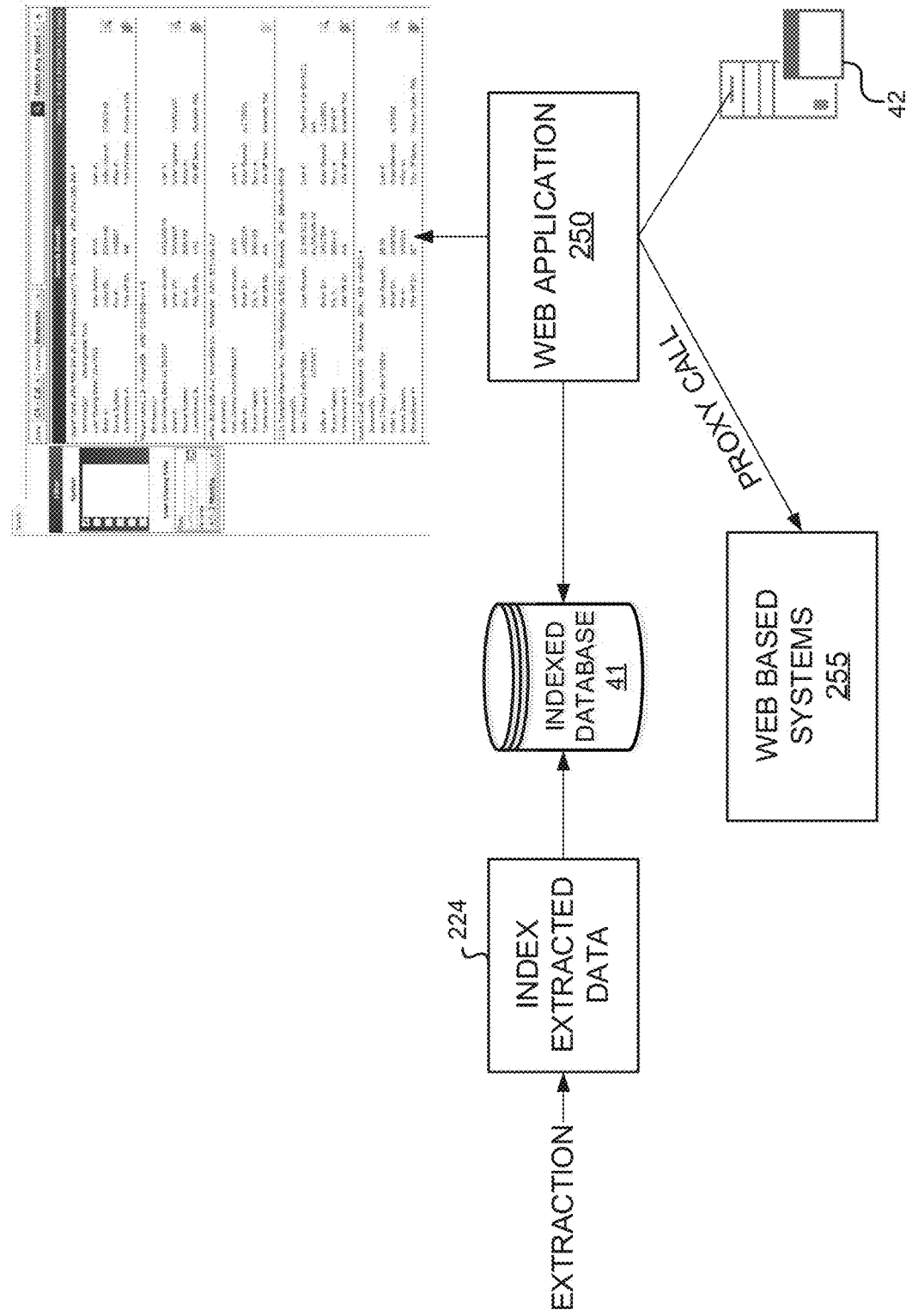
FIG. 3C illustrates an example architecture and associated processes for accessing extracted data using a web application in various embodiments.

FIGS. 3A-3C illustrate an example overview of an operational workflow for OCR'ing a document image, extracting and indexing data from the OCR'ed document image, and providing the extracted data to a web application in accordance with various embodiments. For example, the workflow of FIGS. 3A-3C may provide database service system 40 a set of results that are stored in indexed database 41 and made accessible through a web application provided by application server 42. In one implementation, the results stored in indexed database 41 comprise a plurality of title exceptions.

FIG. 3A illustrates an example OCR process that may be performed in accordance with various embodiments. The OCR process of FIG. 3A may be performed, for example, by system 20 on digital files for physical documents 12 that are scanned or other digital files that are in a digital image format. At operation 202, image pre-processing can be performed on a document image, e.g., a document that has been scanned into some digital image format, such as a BMP, TIFF, JPEG, etc. Image pre-processing can involve one or more techniques to "fine-tune" a document image. For example, image pre-processing may include, but is not limited to straightening lines, filling in missing words or letters in some character string, and completing a character string. Another example of image pre-processing may include determining that a character is actually an "o" rather than a "0," that a character is a "3" rather than a "B," etc. In the context of determining what a character is, for example, image pre-processing can determine whether some character is a number rather than a letter prior to attempting to recognize the character as a letter and extract it as such. That is image pre-processing can be utilized to improve the quality of or otherwise refine the output of the OCR process.

At operation 204, OCR conversion of the (scanned) document image is performed. As a result of the OCR conversion, a textual data representation of the document image is created at operation 206. Further refinement of the OCR process can occur through the performance of supervised, semi-supervised or automated OCR error correction at operation 208. For example, in the case of supervised OCR correction, a human analyst may manually review the textual data representation of the document image to further refine or improve the quality of the OCR process. That is, the automated aspects of the OCR process may still result in certain errors. For example, image pre-processing may not correctly distinguish between all the letters and numbers present in the document image, in which case, the human analyst can manually correct any remaining issues not correctly converted by the OCR process. In other implementations, additional refinement processes may be employed, such as semi supervised or supervised review. For example, in the case of semi-supervised review, an OCR process may present (e.g., display) a set of suggested corrections or conversions, and the human analyst may pick from the suggested set or input new corrections or conversions.

At operation 210, feedback is obtained as a result of the supervised, semi-supervised, or automated OCR correction performed at operation 208, and this feedback may then be translated into one or more pre-processing rules that can be incorporated into the image pre-processing operation at 202 for use in performing subsequent OCR operations and/or to re-OCR the document image. Such pre-processing rules can include, but are not limited to de-speckling, binarization, line removal, and the normalization of aspect ratio and scale. The use of such feedback allows the OCR process to learn and continually improve its output in accordance with various embodiments.

It should be noted that subsequent to the creation of a textual data representation of the document image at 206, the textual data representation of the document image can be further processed using one or more extraction methods as will be described in greater detail below. It should be further noted that a textual data representation of the document image of sufficient quality or accuracy can be produced without the use of feedback, and/or over time, the OCR process may become sufficiently accurate after incorporating enough feedback and refining of the image pre-processing rules. In the context of re-OCR'ing a document image, the document image may undergo one or more subsequent OCR processes to determine whether additional/more accurate textual data can be gained after the image pre-processing has been adjusted to account for, e.g., any updated rules used for fine-tuning the document image.

For example, in embodiments, it may be determined whether or not the resulting textual data representation of the document image has a desired accuracy in accordance with the needs and/or preferences of a business entity, system administrator, human analyst, etc. If the desired accuracy has not been met (e.g., as determined by a human analyst performing supervised error correction, for example), multiple pre-processing profiles can be applied or utilized to re-OCR the document image. A first profile can be a combination of pre-processing methods to enhance the image using various image enhancement methods such as deskewing, line removal, and/or or cleaning up the document image to remove noise, such as stray dots from the document image, while OmniPage refers to an OCR tool provided by Nuance Communications, Inc., that includes various pre-processing functionality that can be automatically applied. A second profile can be another combination of pre-processing methods including the aforementioned image enhancement, auto-Omnipage and Erode processing, where erosion processing can refer to one technique for analyzing and processing structures in, e.g., binary or grayscale images, to shrink or otherwise reduce boundary regions of foreground pixels. After applying each of the aforementioned pre-processing profiles to OCR the document image, the most accurate textual data representation of the document image can be selected.

After the document image undergoes the aforementioned OCR process, the resulting textual data representation or file may then undergo an extraction process. FIG. 3B illustrates an example extraction process performed in accordance with various embodiments. At operation 212, processing rules such as type classification may be applied to the textual data representation result of the OCR process. As will be discussed in greater detail, one or more extraction techniques or methods can be applied to a textual data representation of a document image. Each of these extraction techniques or methods may have or may be associated with certain processing rules in accordance with which each of the extraction techniques or methods may be performed.

One such extraction method can be referred to as key-value pair (KVP), name-value pair, field-value pair, or attribute-value pair extraction. Extraction based on KVP may associate a unique identifier or attribute (i.e., a "key") for a data item with a value, which may be the identified data or a pointer to the location of the identified data. For example, a key may be a "date" field, "exception" field or other attribute found within a sentence, paragraph, or multiple paragraphs of the document, and the value may be an associated date (e.g. "Oct. 2, 2013") or exception (e.g., "easement" or "lien"). Keys may be descriptive (i.e., have numerous values), binary (i.e., have only two values such as yes/no) or numerical (i.e., have numerical values).

Another extraction method that may be employed in accordance with various embodiments can be referred to as natural language processing (NLP) extraction. Extraction based on NLP can allow data (character strings) such as numbers, pronouns, character strings that, e.g., look like an address, character strings that appear to be a proper noun, e.g., a name, etc. to be extracted from the textual data representation of the document image, processing rules can be developed and relied upon to extract such data. That is, underlying linguistic structures and relationships grammatical rules, context, etc., in textual data may be analyzed to extract relevant data from the textual data representation of the document image. Thus, patterns in documents can be identified and utilized to extract information following such patterns.

Another extraction method that may be employed in accordance with various embodiments can be referred to as coordinate-based extraction. In coordinate-based extraction, it is known, or it can be assumed that at a particular position/location of a digital document, certain information exists. For example, and in the context of some real estate-based documents, it may be known that an attorney involved in a real estate transaction described in the real estate-based document should be located at, e.g., the top left-hand corner and one inch from the top of the real estate-based document. Accordingly, instructions or rules can be written and utilized to extract data at a particular location, where the extracted data can be assumed to be a particular type of data.

Similar to coordinate-based extraction, quadrant-based extraction is another extraction method that may be used in accordance with various embodiments to extract data. Some document images may be received in a compressed format. For example, an original document may physically exist on/in an 8.5×14 paper/format, but upon scanning (prior to the OCR process), the document image may be compressed to an 8.5×11 format. Accordingly, extracting certain information can no longer rely on the location/coordinates, e.g., one inch from the top, relative to its original format, but rather a converted location or quadrant may be utilized to extract data, e.g., 0.75 inches from the top (based on the applied compression).

Regular expression extraction may be another extraction technique utilized in accordance with various embodiments. A regular expression can be a pattern describing a certain amount of text, where a match to that pattern, e.g., some piece of text or character sequence, can be searched for in the textual data representation of the document image. That is, a search can be performed for a term or phrase that is known to exist in a document. Additionally, some area around or relative to the identified expression can be extracted. For example, for a given title policy, a search for the regular expression "exceptions from coverage" can be performed. If data that includes enumerated paragraphs is found relative to where that regular expression was found, such as underneath the expression "exceptions from coverage", the character strings corresponding to each of those paragraphs can be assumed to be title exceptions. That data may then be extracted.

It should be noted that processing rules can be applied and utilized in one or more extraction processes for teaching an extraction engine how to extract information in a desired manner, e.g., as it applies to certain documents in the real estate industry. For example, in a KVP context, processing rules may be utilized to teach how KVP extraction may be optimized and applied to real estate documents. When extracting information from a document classified/characterized as an attorney document, the attorney document can be processed using a coordinate-based extraction engine, as it can be assumed that attorneys rely on known form documents, where information can be extracted based on position/location. If however, the document is classified/characterized as some other type of document that may not lend itself to coordinate-based extraction, the processing rules will instruct the system and method to extract information using a different extraction engine/method, e.g., a KVP extraction engine/method.

At operation 214, one or more extractions may be performed to extract data from the textual data representation of the document image and contextualize the extracted data. The one or more extractions may be performed in accordance with one or more processing rules applicable to one of the aforementioned extraction techniques or methods. It should be noted that other extraction techniques may be used in place of or in addition to those already mentioned in accordance with various embodiments, as may be deemed necessary or preferable depending on the desired extraction, needs, etc. of a particular document/document image type or format, industry in which various embodiments are utilized, etc.

At operation 216, an automated validation process can be performed to confirm the validity of any extracted data. The automated validation process may be performed using existing data or data assets. That is, and once the extracted data has been associated with a context, that extracted data can be compared to existing data or data assets (e.g., previously processed documents or extracted and contextualized data) to confirm whether or not the associated or otherwise applied context is true or valid. For example, extracted data may be an extracted name or title exception, and that extracted name or title exception may be contextually associated with an address of a particular real estate property. Existing data or data asserts may be accessed for comparison to determine whether the extracted name has been previously associated with the address of the particular real estate property, whether the address is a valid address, etc. Moreover, automated validation may involve accessing various data sources to determine that a person or property identified by the extraction process is otherwise associated with the current transaction.

Similar to the manual error correction and feedback associated with the previously described OCR process, semi-supervised or automated correction can be performed at operation 220. Research and training feedback based on the manual error correction can be provided to update and/or adjust the processing rules at operation 222. For example, extracted data may still erroneous, e.g., the extracted data results in a character string "be3n." Manual error correction can be utilized to determine whether the character string should read "been." It should be noted that such errors can also be validated as part of automated validation operation 218 depending on what existing data or data assets are utilized for comparison.

In conjunction with the error correction and feedback operations 220 and 222, accuracy of the applied extraction method(s) or technique(s) can be measured and analyzed. For example, error correction operation 220 may reveal that the applied extraction method(s) results in a 90% accuracy rate. If 90% accuracy is predetermined to be a threshold, anytime one or more extraction methods results in a measured accuracy of less than 90% results in feedback requiring adjustment of/training for the one or more extraction methods.

At operation 218, the extracted data is provided to a database system (e.g., system 40). That is, the textual data representation of a document image that has resulted from the aforementioned OCR process may be provided to the database system. Additionally, any and all extracted data, i.e., metadata, retrieved from the aforementioned extraction process may also be provided to the database system. Extracted data may be filtered (43) and further refined using transformational business or underwriting rules. In a real estate-related document, for example, the extracted data/metadata can include, but is not limited to, e.g., the following: title of the real estate-related document; associated state and county information; address, assessor's parcel number (APN) assigned to a particular real estate property; title exceptions; any relevant party names; a type of document or document classification; document number, recording date; any reference document(s) that may be related to the real estate-related document; and any legal description of the real estate property.

The extracted data/metadata can be used to provide an index for attaching existing data or data assets. In other words, the index may tie existing data or data assets to the extracted data to thereby grow a real estate-related knowledge base that can be accessed by a web application, as further described below. For example, a search performed for a particular property can provide a coded list of title exceptions associated with the property and/or neighboring properties.

FIG. 3C illustrates an example architecture and associated processes for accessing the extracted data using a web application in various embodiments. As previously described, the textual data representation of a document image may be received, as well as any and all extracted data/metadata obtained from the extraction process. At operation 224, the extracted data, along with any extracted metadata, may be indexed. For example, extracted data elements may be indexed on a field in a table by creating a field value and a pointer to a document it relates to. In the example of FIG. 2C, the extracted data in indexed database 41. In one embodiment, database 41 may be a NoSQL database.

The textual data representation of a document and any extracted data/metadata may be made available to web application 250, which may be hosted by application server 42. In embodiments, web application 250 provides a user interface for searching or querying data indexed in database 41, defining user rules for filtering the indexed data, and filtering the data in accordance with user defined rules. In embodiments, the web application may perform these functions by initiating proxy calls to one or more external web services 255. In one embodiment, indexed database 41 is also a component of an external web service that may be accessed by proxy call. In further embodiments, web based services 15 may comprise additional indexed databases that provide additional data.

Figure 4:
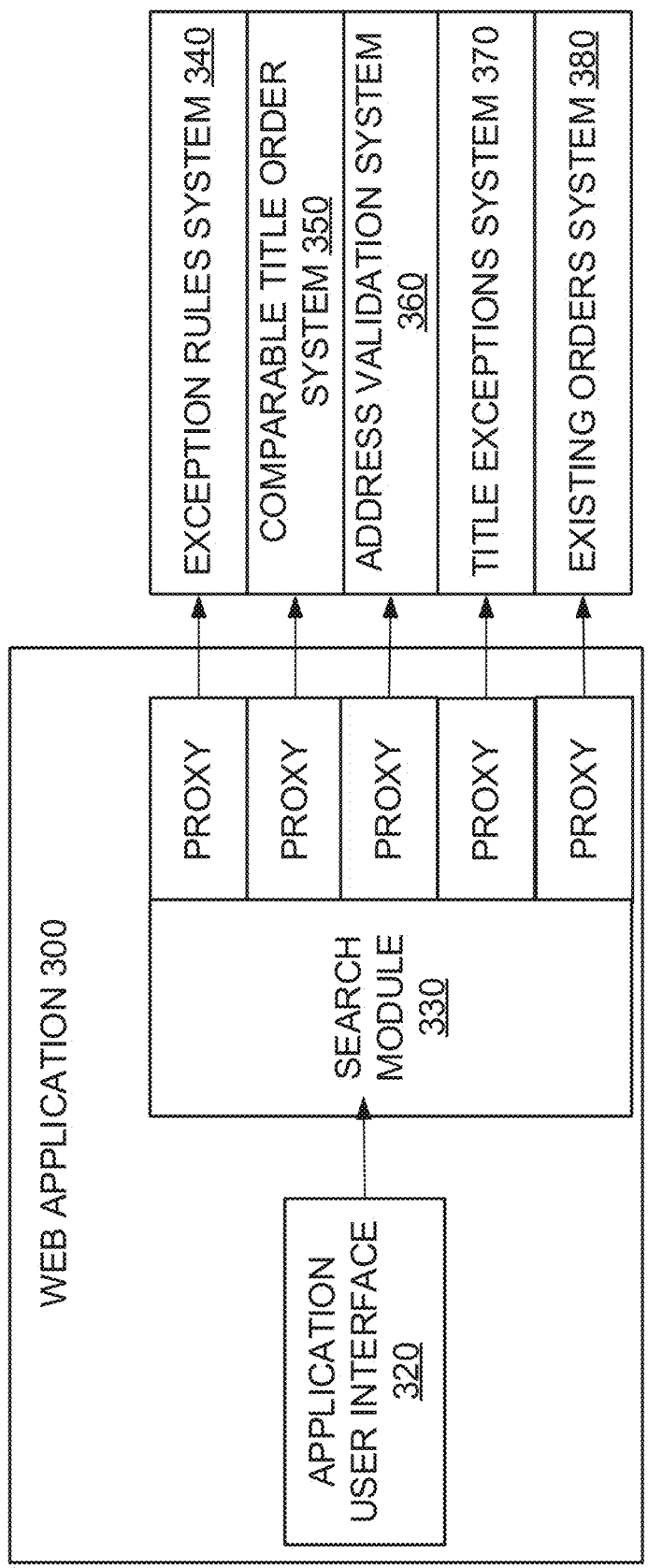
FIG. 4 is a block diagram illustrating example components of an example web application that may be used in embodiments to generate or assist in the generation of title products.

FIG. 4 is a block diagram illustrating example components of an example web application 300 that may be used in embodiments to generate or assist in the generation of title products (e.g., policies and reports). As shown, web application 300 includes an application user interface 320 (e.g., a graphical user interface) for displaying search results, displaying information retrieved from external services, displaying information generated by application 300, and receiving user inputs. In this example embodiment, web application 300 uses search module 330 to call, via proxy, external systems 340-380 (e.g., external web services) that provide information and functions that may be used to generate title products. For example, web service proxy classes may be created for each of systems 340-380. Alternatively, in other embodiments, the functionalities provided by one or more systems 340-380 may be implemented as modules of web application 300. Although web application 300 is illustrated in this embodiment as only having read access to systems 340-380, in alternative embodiments application 300 may have read and write access to one or more systems 340-380.

Exceptions rules system 340 may store and manage a set of rules that may be used to filter or modify title exceptions and/or KVP extracted from documents. Additionally, the rules may be used to derive new title exceptions and/or KVP. The rules, in embodiments, may also be used to determine which title exceptions are included and which title exceptions are excluded from created title products. In some instances, a KVP extracted from a prior document may be updated. In another instance, a KVP extracted from a prior document may not be used in the creation of the new document. In yet another instance, a new KVP may be generated for a new document.

Rules may specify conditions under which deed of trust paragraphs are raised, conditions under which tax paragraphs are raised, conditions under which easement paragraphs are raised, and other conditions under which title exceptions are raised. The conditions, in various embodiments, may depend on a current date, a type of title product being generated, a state/county associated with the title product, and other information. Additionally, the rules may be used to generate new KVPs or associate existing KVPS with new sentences, or paragraphs. For example, when a title exception is worded differently for legal or underwriting reasons, KVP may be used to create new types of exceptions.

As another example, consider the case when title exceptions are extracted from a title policy that is two years old. In this example, a rule may exclude tax exceptions that affect the property because taxes have likely been paid at that point. As a further example, consider the case where data is extracted from a newly filed tax document that indicates delinquent taxes on a property. In this example, a rule may derive a new KVP and associated tax exception paragraph for the property. The rules, in various embodiments, may refer to the exceptions using the KVP, exception phrase codes, or some combination thereof.

Comparable title order system 350 may retrieve title order information for properties within a specified distance of a specified property. For example, using search module 330, a user may search for comparable properties using a property address or Assessor Parcel Number ("APN"). The comparable properties may be displayed as a selectable list and existing title order information such as title exceptions may be retrieved for these properties. Address validation system 360 may validate and standardize addresses and obtain address information such as street-level longitude and latitude. This information may be used to ensure that searches performed on application 300 for a property retrieve information for relevant property.

Title exceptions system 370 may provide real estate document images/files and data extracted and/or indexed from real-estate documents, such as, for example, title exceptions, property addresses, and other detailed information. Existing orders system 380 may provide existing title orders related to APN and address data.

Figure 5:
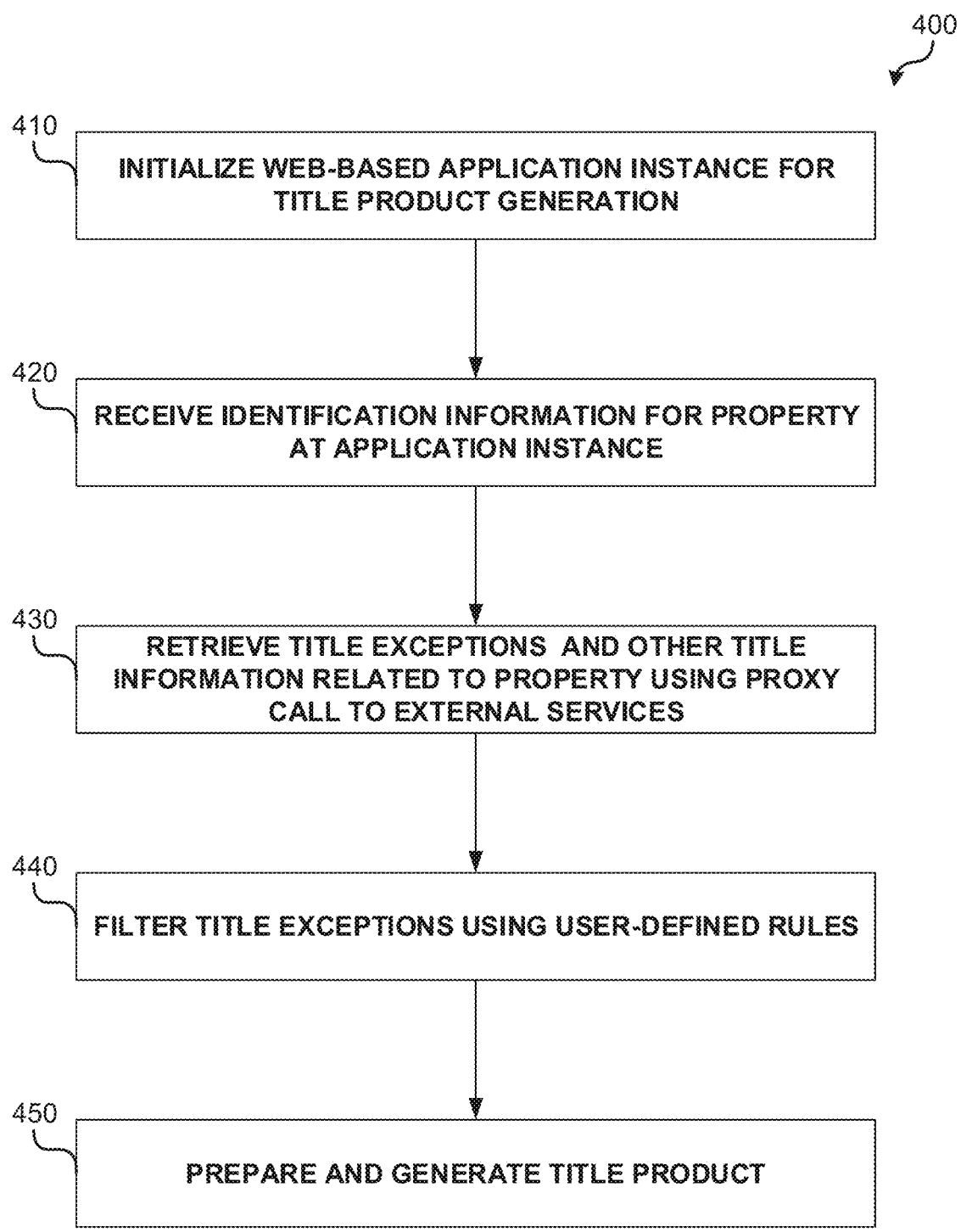
FIG. 5 is an operational flow diagram illustrating an example method that may be implemented using an application for preparing and generating title products in accordance with embodiments.
Figure 6:
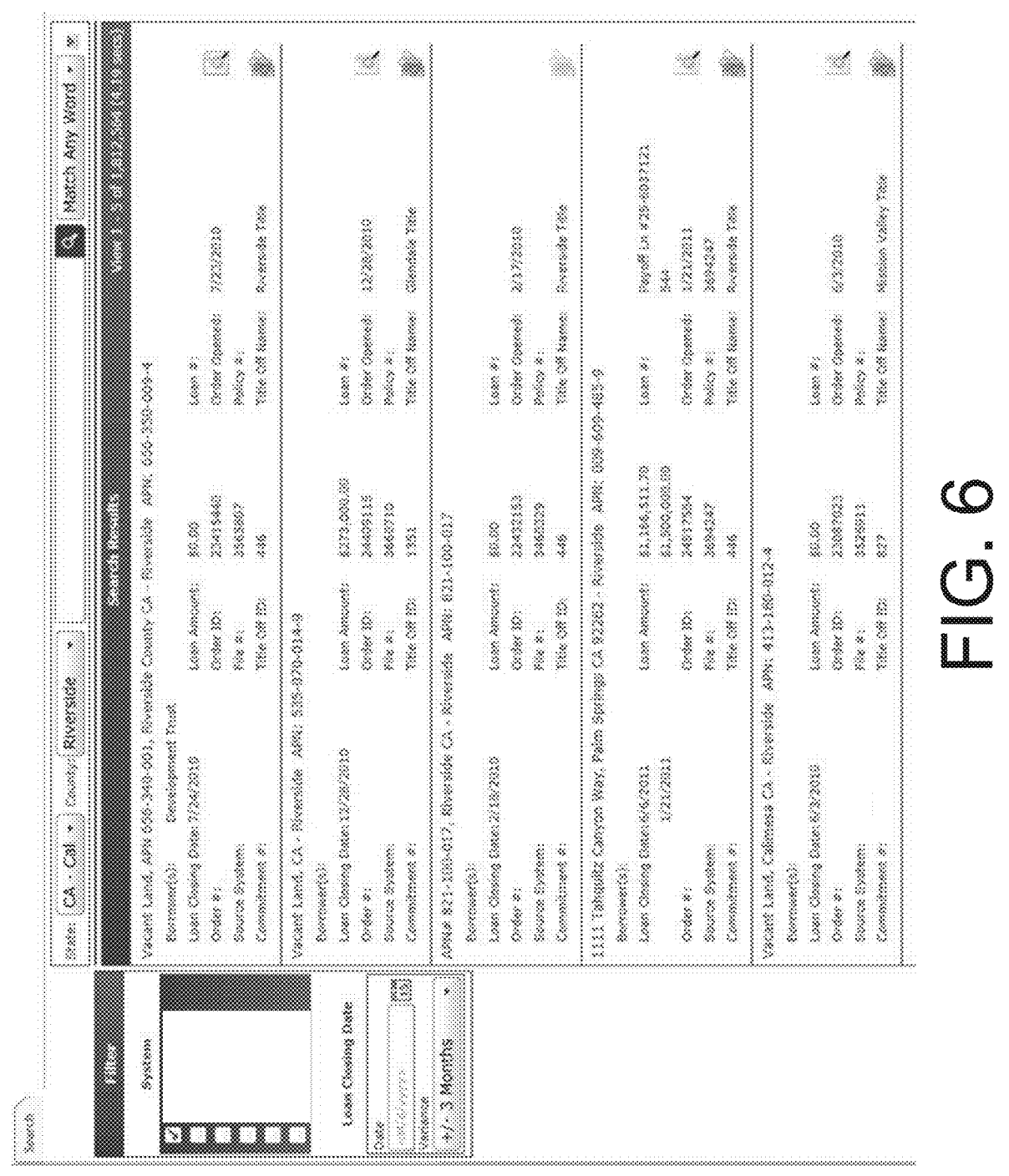

FIG. 5 is an operational flow diagram illustrating an example process 400 that may be implemented using an application for preparing and generating title products (e.g., reports or policies) in accordance with embodiments. FIG. 5 will be described in conjunction with FIGS. 6-8, which illustrate an example graphical user interface for the application. At operation 410, a web-based application (e.g., application 300) may be initialized for title product generation. For example, the web-based application may be hosted by an application server 42. FIG. 6 illustrates an example search platform that may be provided by the application in embodiments. As shown, full index searches may be performed for real estate information. In this example, search results are listed by property address and APN number. Real estate information may be retrieved from one or more selectable systems.

At operation 420, the application receives information identifying a property. For example the information may be entered into a search platform/engine as a property address or APN. At operation 430, title exceptions, title information, and other information relevant to the property may be retrieved by initiating a proxy call to external services (e.g., systems 350-380). In implementations, a prior title product (e.g., a historical report) may be retrieved for the property and used as a starting point (i.e., as a "starter") for generating a new title product. For example, a prior title product may be retrieved by initiating a proxy call to existing orders system 380. In some implementations, no prior title product may be available for the property. In such implementations, a title product for a nearby property within a search radius may be retrieved (e.g., by initiating a proxy call to comparable title order system 350).

Figure 7:
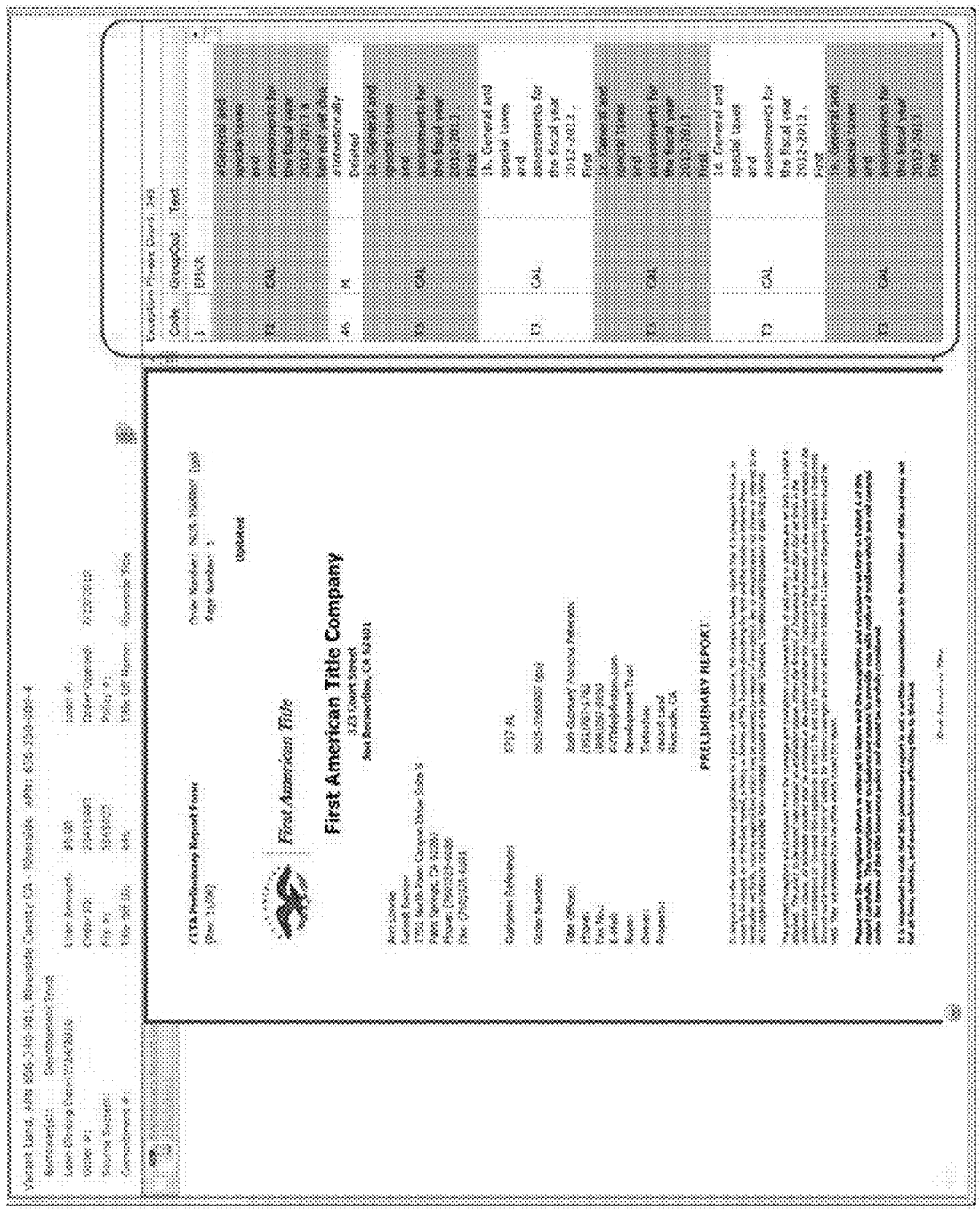
FIG. 7 illustrates a graphical user interface, including a retrieved starter document and detailed data attributes, for an application for generating title products.

FIG. 7 illustrates a GUI associated with the application after retrieval of an example starter (e.g., a preliminary title report) and detailed data attributes. The GUI may display exceptions data elements extracted from the document. Each of the exceptions may be associated with an exceptions code.

Thereafter, at operation 440, retrieved title exceptions may be filtered using user-defined rules. For example, a proxy call may be made to exception rules system 340 to remove exceptions from a starter document and add new exceptions to the starter document. In embodiments, the rules used to filter exceptions may have been previously defined by a user or system currently performing process 400. FIG. 8 illustrates a graphical user interface for defining rules that may be used to filter exceptions. For example, one of the defined rules may specify that if a deed of trust has as a beneficiary a particular corporation, a deed of trust exception needs to be raised to comply with underwriting requirements. At operation 450, after filtering title exceptions based on the user-defined rules, the title product may be prepared and generated.

Figure 9:
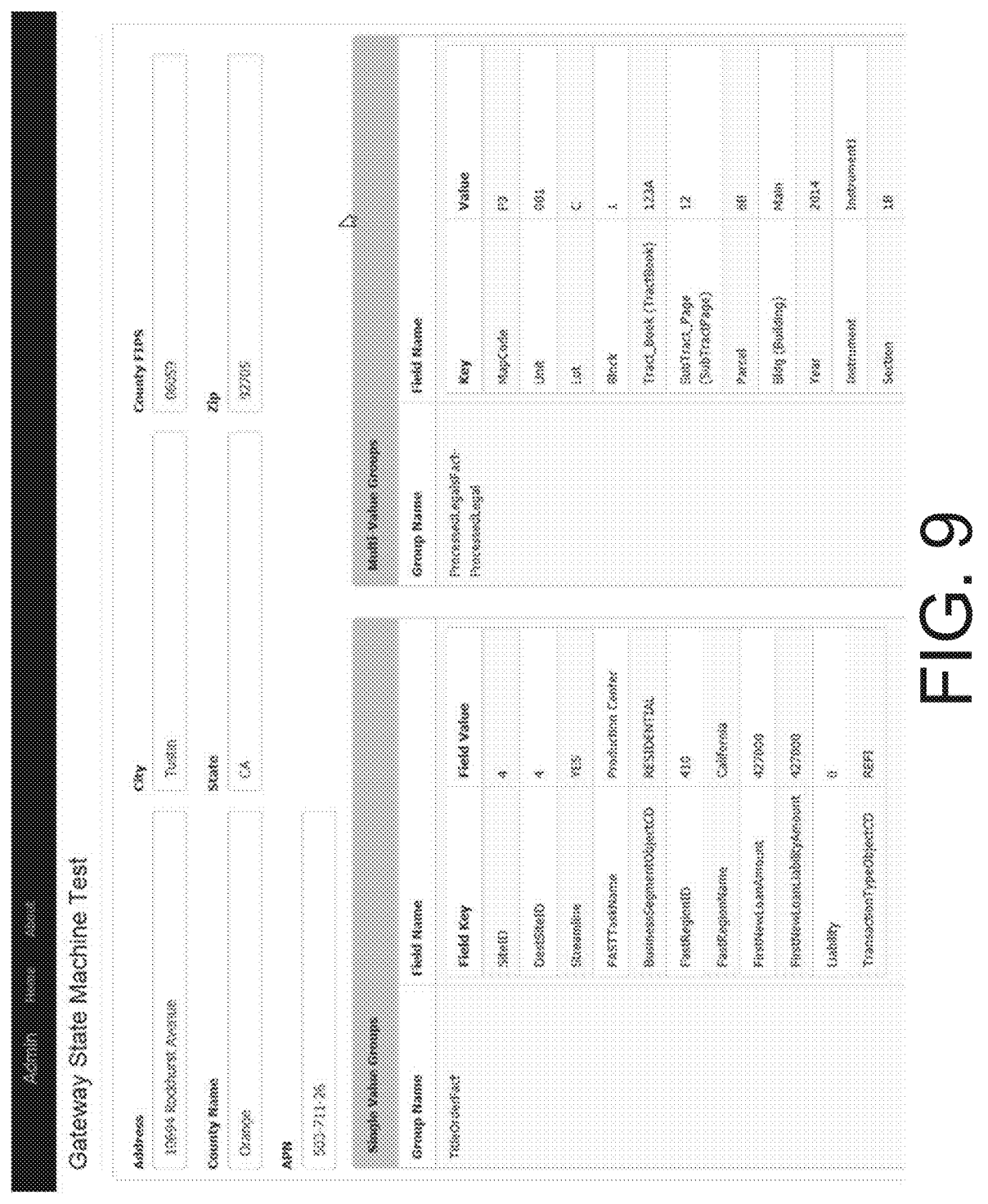
Figure 11:
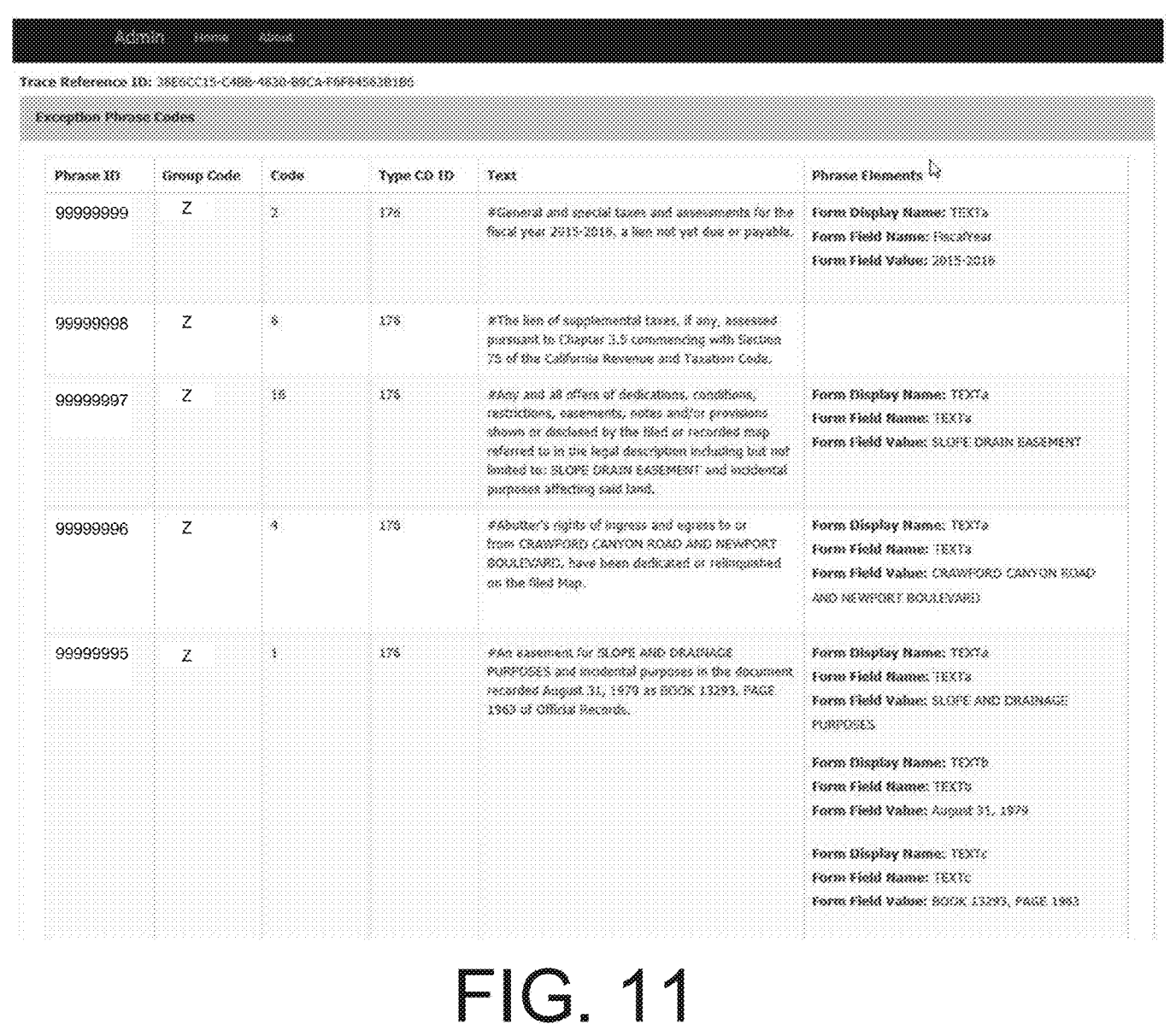

FIGS. 9-11 illustrate another example graphical user interface that may be implemented as part of an application for generating a title product for a property. Properties may be searched by address and/or APN. A search may retrieve one or more documents including relevant title information and other information. The retrieved documents may be indexed by ID, type, status, and other information. Exception phrase codes may be retrieved from the documents. The exception phrase codes may have an associated phrase ID, a code, and text.

Figure 12:
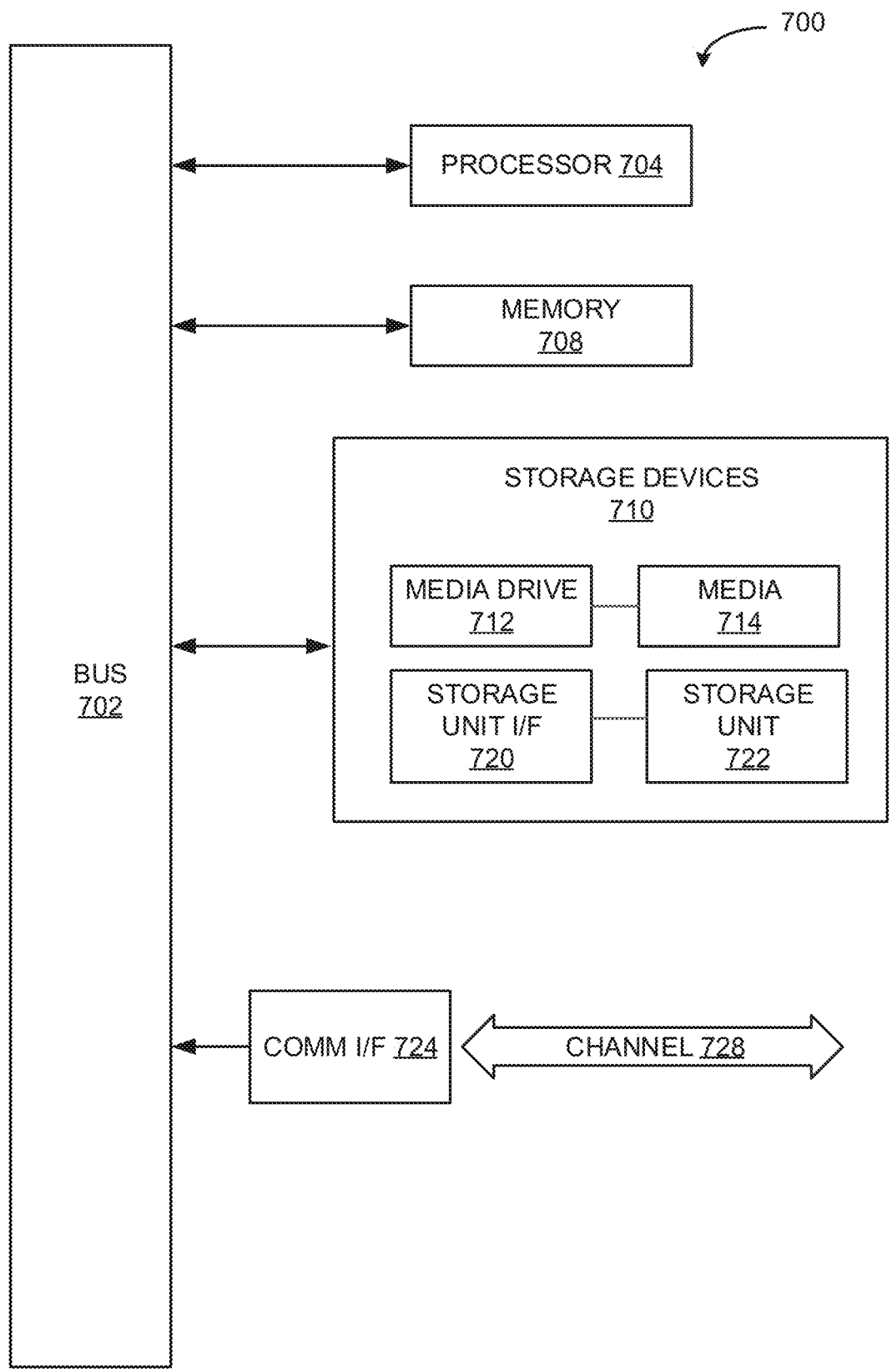
FIG. 12 is an example of a computing module that can be used in conjunction with various embodiments of the present disclosure.

FIG. 12 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 12. Various embodiments are described in terms of this example-computing module 700. After reading this description, it will become apparent to a person skilled in the relevant art how to implement the application using other computing modules or architectures.

Referring now to FIG. 12, computing module 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD or DVD drive (R or RW), or other removable or fixed media drive might be provided. Accordingly, storage media 714 might include, for example, a hard disk, a solid state drive, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 708, storage unit 722, and media 714. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A system comprising one or more non-transitory computer-readable mediums having computer executable program code stored thereon, the computer executable program code configured to cause the system to:
    extract data from one or more digital documents, the extracted data comprising a first plurality of elements of a first type, the elements of the first type comprising key-value pairs and associated paragraphs, wherein the one more digital documents comprise documents associated with real property;
    index the extracted data;
    host a web-based application instance, the web-based application instance comprising a user interface for searching the indexed data and filtering elements of the first type based on rules defined by a user of the user interface, wherein the user interface allows the user to define rules to modify indexed elements of the first or to create new indexed elements of the first type;
    receive a request to search for a real property at the user interface of the application instance, the request comprising information identifying the real property;
    in response to receiving the request, search the indexed data for information related to the real property, wherein searching the indexed data for information related to the real property comprises retrieving one or more paragraphs of a prior document of the real property;
    use at least the application instance to receive a rule for filtering the elements of the first type, wherein the received rule specifies a condition under which a paragraph is included, excluded, or modified, wherein the received rule refers to a key-value pair associated with the paragraph;
    filter the elements of the first type based on the received rule, wherein filtering elements of the first type comprises applying the received rule to the retrieved paragraphs of the prior document; and
    using at least the filtered elements of the first type, creating a new document associated with the real property, the created new document comprising a subset of the paragraphs of the prior document.

2. The system of claim 1, wherein filtering elements of the first type based on the received rule comprises generating a new key-value pair and associated paragraph.

3. The system of claim 1, wherein filtering elements of the first type based on the received rule comprises associating an existing key-value pair with a new paragraph.

4. The system of claim 1, wherein filtering the elements of the first type comprises initiating a proxy call at the application instance to a rules system storing the received rule.

5. The system of claim 1, wherein the extracted elements of the first type comprise key-value pairs and associated title exception paragraphs, wherein the rule specifies a condition under which a title exception is included or excluded from a title product.

6. The system of claim 1, wherein the computer executable program code is configured to further cause the system to:
    contextualize the extracted data; and
    perform supervised, semi-supervised, or automated validation of the contextualization of the extracted data.

7. The system of claim 1, wherein extracting the data comprises applying at least one of: natural language processing extraction, coordinate-based extraction, quadrant-based extraction, and regular expression extraction.

8. The system of claim 1, wherein extracting the data comprises:
    performing image pre-processing on a document image;
    performing optical character recognition on the document image;
    creating a textual data representation of the document image; and
    apply processing rules to the textual data representation.

9. A computer-implemented method, comprising:
    extracting data from one or more digital documents, the extracted data comprising a first plurality of elements of a first type, the elements of the first type comprising key-value pairs and associated paragraphs, wherein the one more digital documents comprise documents associated with real property;
    indexing the extracted data;
    hosting a web-based application instance, the web-based application instance comprising a user interface for searching the indexed data and filtering elements of the first type, including the key-value pairs and associated paragraphs, based on rules defined by a user of the user interface, wherein the user interface allows the user to define rules to modify indexed elements of the first type, including the key-value pairs and associated paragraphs, or to create new indexed elements of the first type, including the key-value pairs and associated paragraphs;
    receiving a request to search for a real property at the user interface of the application instance, the request comprising information identifying the real property;
    in response to receiving the request, search the indexed data for information related to the real property, wherein searching the indexed data for information related to the real property comprises retrieving one or more paragraphs of a prior document of the real property;
    using at least the application instance, receiving a rule for filtering the elements of the first type, wherein the received rule specifies a condition under which a paragraph is included, excluded, or modified, wherein the received rule refers to a key-value pair associated with the paragraph, the key of the key-value pair comprising an attribute found within the associated paragraph, and the value of key-value pair comprising a value of that attribute;
    filtering the elements of the first type based on the received rule, wherein filtering elements of the first type comprises applying the received rule to the retrieved paragraphs of the prior document to determine which of the retrieved paragraphs to include, exclude, or modify during creation of a new document; and
    using at least the filtered elements of the first type, creating the new document associated with the real property, the created new document comprising a subset of the retrieved paragraphs of the prior document.

10. The computer-implemented method of claim 9, wherein the extracted elements of the first type comprise key-value pairs and associated title exception paragraphs, wherein the rule specifies a condition under which a title exception is included or excluded from a title product.

11. The computer-implemented method of claim 10, wherein filtering elements of the first type based on the received rule comprises generating a new key-value pair and an associated title exception paragraph.

12. The computer-implemented method of claim 10, wherein filtering elements of the first type based on the received rule comprises associating an existing key-value pair with a new title exception paragraph.

13. The computer-implemented method of claim 10, wherein filtering the elements of the first type comprises initiating a proxy call at the application instance to an exception rules system storing the received rules.

14. The computer-implemented method of claim 13, further comprising: filtering one or more title exceptions of the prior title report or policy based on the received rules.

15. The computer-implemented method of claim 10, wherein searching the indexed data for title information related to the real property comprises retrieving a prior title report or policy of the real property, wherein the prior title report or policy comprises one or more title exceptions.

16. The computer-implemented method of claim 9, further comprising:
   contextualizing the extracted data; and
   performing automated validation of the contextualization of the extracted data.

17. The computer-implemented method of claim 9, wherein extracting the data comprises applying at least one of: natural language processing extraction, coordinate-based extraction, quadrant-based extraction, and regular expression extraction.

18. The computer-implemented method of claim 9, wherein extracting the data comprises:
   performing image pre-processing on a document image;
   performing optical character recognition on the document image;
   creating a textual data representation of the document image; and
   apply processing rules to the textual data representation.

\* \* \* \* \*